(12) United States Patent
Reed et al.

(10) Patent No.: US 10,231,590 B2
(45) Date of Patent: Mar. 19, 2019

(54) BATTERY-POWERED CORDLESS CLEANING SYSTEM

(71) Applicant: Techtronic Industries Co. Ltd., Tsuen Wan, New Territories (HK)

(72) Inventors: Brett A. Reed, Alliance, OH (US); Mark Reindle, Glenwillow, OH (US); Will Sebastian, Sagamore Hills, OH (US)

(73) Assignee: Techtronic Industries Co. Ltd., Tsuen Wan, New Territories (HK)

( * ) Notice: Subject to any disclaimer, the term of this patent is extended or adjusted under 35 U.S.C. 154(b) by 0 days.

(21) Appl. No.: 15/844,782

(22) Filed: Dec. 18, 2017

(65) Prior Publication Data

US 2018/0103815 A1   Apr. 19, 2018

Related U.S. Application Data

(63) Continuation of application No. 15/262,070, filed on Sep. 12, 2016, now Pat. No. 9,844,310, which is a
(Continued)

(51) Int. Cl.
*H02P 1/00* (2006.01)
*H02P 3/00* (2006.01)
(Continued)

(52) U.S. Cl.
CPC ............... *A47L 9/2842* (2013.01); *A47L 5/26* (2013.01); *A47L 9/0411* (2013.01);
(Continued)

(58) Field of Classification Search
CPC .................. A47L 9/2842; A47L 5/26
(Continued)

(56) References Cited

U.S. PATENT DOCUMENTS

| 4,920,606 A | 5/1990 | Gerke, Jr. et al. |
| 5,222,276 A | 6/1993 | Glenn, III |

(Continued)

FOREIGN PATENT DOCUMENTS

| DE | 4433181 | 3/1996 |
| DE | 10327909 | 1/2005 |

(Continued)

OTHER PUBLICATIONS

International Preliminary Report on Patentability for Application No. PCT/US2014/066865 dated Feb. 17, 2016 (18 pages).
(Continued)

*Primary Examiner* — Erick Glass
(74) *Attorney, Agent, or Firm* — Michael Best & Friedrich LLP

(57) ABSTRACT

A cleaning system including a motor, an impeller driven by the motor, a battery receptacle, and a motor controller. The battery receptacle is configured to receive a battery pack. The battery pack includes one or more battery cells and a battery controller. The motor controller is configured to receive from the battery controller one of a first type of data and a second type of data, and operate the motor at a defined speed, the defined speed being a first speed upon receiving the first type of data, and a second speed upon receiving the second type of data.

8 Claims, 3 Drawing Sheets

Related U.S. Application Data continuation of application No. 14/550,079, filed on Nov. 21, 2014, now Pat. No. 9,456,726.

(60) Provisional application No. 61/907,725, filed on Nov. 22, 2013.

(51) Int. Cl.
| | | |
|---|---|---|
| *H02P 5/00* | (2016.01) | |
| *A47L 9/28* | (2006.01) | |
| *A47L 11/40* | (2006.01) | |
| *A47L 9/04* | (2006.01) | |
| *H02P 6/08* | (2016.01) | |
| *A47L 5/26* | (2006.01) | |

(52) U.S. Cl.
CPC ........... *A47L 9/0477* (2013.01); *A47L 9/2857* (2013.01); *A47L 9/2878* (2013.01); *A47L 9/2884* (2013.01); *A47L 11/4005* (2013.01); *H02P 6/08* (2013.01)

(58) Field of Classification Search
USPC ...................................................... 318/139
See application file for complete search history.

(56) References Cited

U.S. PATENT DOCUMENTS

| | | | |
|---|---|---|---|
| 5,243,732 A | 9/1993 | Koharagi et al. | |
| 5,363,534 A | 11/1994 | Dekker et al. | |
| 5,554,917 A | 9/1996 | Kurz et al. | |
| 6,061,869 A | 5/2000 | Ettes et al. | |
| 6,131,236 A | 10/2000 | Roth | |
| 6,226,830 B1 | 5/2001 | Hendriks et al. | |
| 6,307,358 B1 | 10/2001 | Conrad | |
| 6,374,453 B1 | 4/2002 | Kim | |
| 6,457,205 B1 | 10/2002 | Conrad | |
| 6,519,804 B1 | 2/2003 | Vujik | |
| 6,526,622 B2 | 3/2003 | Conrad | |
| 6,664,748 B2 | 12/2003 | Kushida et al. | |
| 6,941,615 B2 | 9/2005 | Shanor et al. | |
| 7,000,285 B2 | 2/2006 | Conner et al. | |
| 7,049,789 B2 | 5/2006 | Taniguchi et al. | |
| 7,237,298 B2 | 7/2007 | Reindle | |
| 7,313,845 B2 | 1/2008 | Nam | |
| 7,328,479 B2 | 2/2008 | Willenbring | |
| 7,332,881 B2 | 2/2008 | Clark | |
| 7,362,064 B2 | 4/2008 | Coates et al. | |
| 7,377,007 B2 | 5/2008 | Best | |
| 7,456,612 B2 | 11/2008 | Murakami | |
| 7,482,768 B2 | 1/2009 | Lucas | |
| 7,562,414 B2 | 7/2009 | Oh et al. | |
| 7,587,786 B2 | 9/2009 | Zahuranec et al. | |
| 7,690,078 B2 | 4/2010 | Zahuranec et al. | |
| 7,694,383 B2 | 4/2010 | Zahuranec et al. | |
| 7,712,182 B2 | 5/2010 | Zeiler | |
| 7,723,952 B2 | 5/2010 | Phillips et al. | |
| 7,725,223 B2 | 5/2010 | Gordon et al. | |
| 7,825,615 B2 | 11/2010 | Chen et al. | |
| 7,854,038 B2 | 12/2010 | Zahuranec et al. | |
| 7,870,637 B2 | 1/2011 | Parr et al. | |
| 7,950,107 B2 | 5/2011 | Pineschi | |
| 7,979,953 B2 | 7/2011 | Yoo | |
| 8,172,932 B2 | 5/2012 | Oh et al. | |
| 8,196,257 B2 | 6/2012 | Hanschur et al. | |
| 8,286,302 B2 | 10/2012 | Andrup et al. | |
| 8,326,502 B2 | 12/2012 | Snyder et al. | |
| 8,339,101 B2 | 12/2012 | Wu et al. | |
| 8,427,087 B2 | 4/2013 | Yamada | |
| 8,429,792 B2 | 4/2013 | Genn et al. | |
| 8,432,114 B2 | 4/2013 | Clothier | |
| 8,438,693 B2 | 5/2013 | Fujiwara | |
| 8,549,701 B2 | 10/2013 | Fujiwara | |
| 8,595,893 B2 | 12/2013 | Morgan et al. | |
| 8,607,402 B2 | 12/2013 | Gerhards | |
| 8,607,405 B2 | 12/2013 | Reed et al. | |
| 8,671,509 B2 | 3/2014 | Reed et al. | |
| 8,732,896 B2 | 5/2014 | Lucas | |
| 8,756,753 B2 | 6/2014 | Reed et al. | |
| 8,847,532 B2 | 9/2014 | Miyazaki et al. | |
| 8,984,711 B2 | 3/2015 | Ota et al. | |
| 9,007,002 B2 | 4/2015 | Niizuma et al. | |
| 2004/0255426 A1 | 12/2004 | Davis et al. | |
| 2005/0022338 A1 | 2/2005 | Muhlenkamp | |
| 2005/0071056 A1 | 3/2005 | Tondra et al. | |
| 2005/0097701 A1 | 5/2005 | Kushida et al. | |
| 2005/0189915 A1 | 9/2005 | O'Neill | |
| 2006/0123587 A1 | 6/2006 | Parr et al. | |
| 2007/0094839 A1 | 5/2007 | Zahuranec et al. | |
| 2007/0101536 A1 | 5/2007 | Nielsen | |
| 2007/0136979 A1 | 6/2007 | Zahuranec | |
| 2007/0157418 A1 | 7/2007 | Zahuranec et al. | |
| 2007/0261196 A1 | 11/2007 | Edginton et al. | |
| 2008/0086833 A1 | 4/2008 | Capron-Tee | |
| 2008/0157717 A1 | 7/2008 | Weston et al. | |
| 2008/0284363 A1 | 11/2008 | Lucas et al. | |
| 2009/0271944 A1 | 11/2009 | Lovelass | |
| 2010/0084150 A1 | 4/2010 | Suzuki et al. | |
| 2010/0141186 A1 | 6/2010 | Katzenberger et al. | |
| 2010/0155162 A1 | 6/2010 | Nakamura et al. | |
| 2010/0187899 A1 | 7/2010 | Suzuki | |
| 2010/0253257 A1 | 10/2010 | Clothier et al. | |
| 2010/0270095 A1 | 10/2010 | Shono | |
| 2010/0281646 A1 | 11/2010 | Fujiwara | |
| 2011/0197389 A1 | 8/2011 | Ota et al. | |
| 2011/0279071 A1 | 11/2011 | Yamada | |
| 2011/0288711 A1 | 11/2011 | Yanagisawa | |
| 2012/0112670 A1 | 5/2012 | Danestad et al. | |
| 2012/0152285 A1 | 6/2012 | Gerhards et al. | |
| 2012/0159734 A1 | 6/2012 | Fujiwara | |
| 2012/0317743 A1 | 12/2012 | Reed et al. | |
| 2012/0317749 A1 | 12/2012 | Spiggle | |
| 2013/0152333 A1 | 6/2013 | Reed et al. | |
| 2013/0319478 A1* | 12/2013 | Hensel | A47L 9/20 134/37 |
| 2014/0100736 A1* | 4/2014 | Kim | G05D 1/0219 701/26 |
| 2014/0244082 A1 | 8/2014 | Caron | |
| 2015/0280630 A1 | 10/2015 | Yoon | |
| 2015/0333666 A1* | 11/2015 | Miller | H02P 4/00 318/139 |

FOREIGN PATENT DOCUMENTS

| | | |
|---|---|---|
| EP | 2659824 | 11/2013 |
| FR | 2774200 | 7/1999 |
| GB | 2225219 | 5/1990 |
| GB | 2469142 | 10/2010 |
| GB | 2490256 | 10/2012 |
| JP | H10314078 | 2/1998 |
| WO | WO 2007/083153 | 7/2007 |

OTHER PUBLICATIONS

Chinese Patent Office Action for Application 2010480063278.1 with English Translation dated Mar. 21, 2017 (19 pages).

* cited by examiner

BATTERY-POWERED CORDLESS CLEANING SYSTEM

RELATED APPLICATION

This application is a continuation of U.S. patent application Ser. No. 15/262,070, filed Sep. 12, 2016, which issued as U.S. Pat. No. 9,844,310 on Dec. 19, 2017, which is a continuation of U.S. patent application Ser. No. 14/550,079, filed on Nov. 21, 2014, which issued as U.S. Pat. No. 9,456,726 on Oct. 4, 2016, which claims priority to U.S. Provisional Application 61/907,725, filed Nov. 22, 2013, the entire contents of all which are incorporated herein by reference.

BACKGROUND

The invention relates to consumer devices, such as vacuum cleaners.

SUMMARY

Cleaning systems include a wide range of products designed to meet a wide variety of cleaning needs. Examples of cleaning systems include stick-type vacuums, lightweight upright vacuums, hand-held vacuums, carpet cleaners, canister vacuums, etc.

In one embodiment, the invention provides a cleaning system including a motor, an impeller driven by the motor, a battery receptacle, and a motor controller. The battery receptacle is configured to receive a battery pack. The battery pack includes one or more battery cells and a battery controller. The motor controller is configured to receive from the battery controller one of a first type of data and a second type of data, and operate the motor at a defined speed, the defined speed being a first speed upon receiving the first type of data, and a second speed upon receiving the second type of data.

In another embodiment the invention provides a method of operating a cleaning system. The method including receiving a first battery pack including a first battery controller; receiving a first type of data from the first battery controller; outputting a first control signal based on the first type of data; operating a motor at a first speed based on the first control signal; receiving a second battery pack including a second battery controller; receiving a second type of data from the second battery controller; outputting a second control signal based on the second type of data; and operating the motor at a second speed based on the second control signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A cleaning system includes a motor, a battery receptacle, and a controller, such as a motor controller. The cleaning system receives a first battery pack or a second battery pack. The controller electrically and/or communicatively couples to the first battery pack or the second battery pack. The controller receives data from the first battery pack or the second battery pack and operates the motor based on the received data. In one example, the controller receives a first set of data from the first battery pack and a second set of data from the second battery pack. The controller operates the motor at a first speed if the first set of data is received and at a second speed if the second set of data is received.

Figure 1:
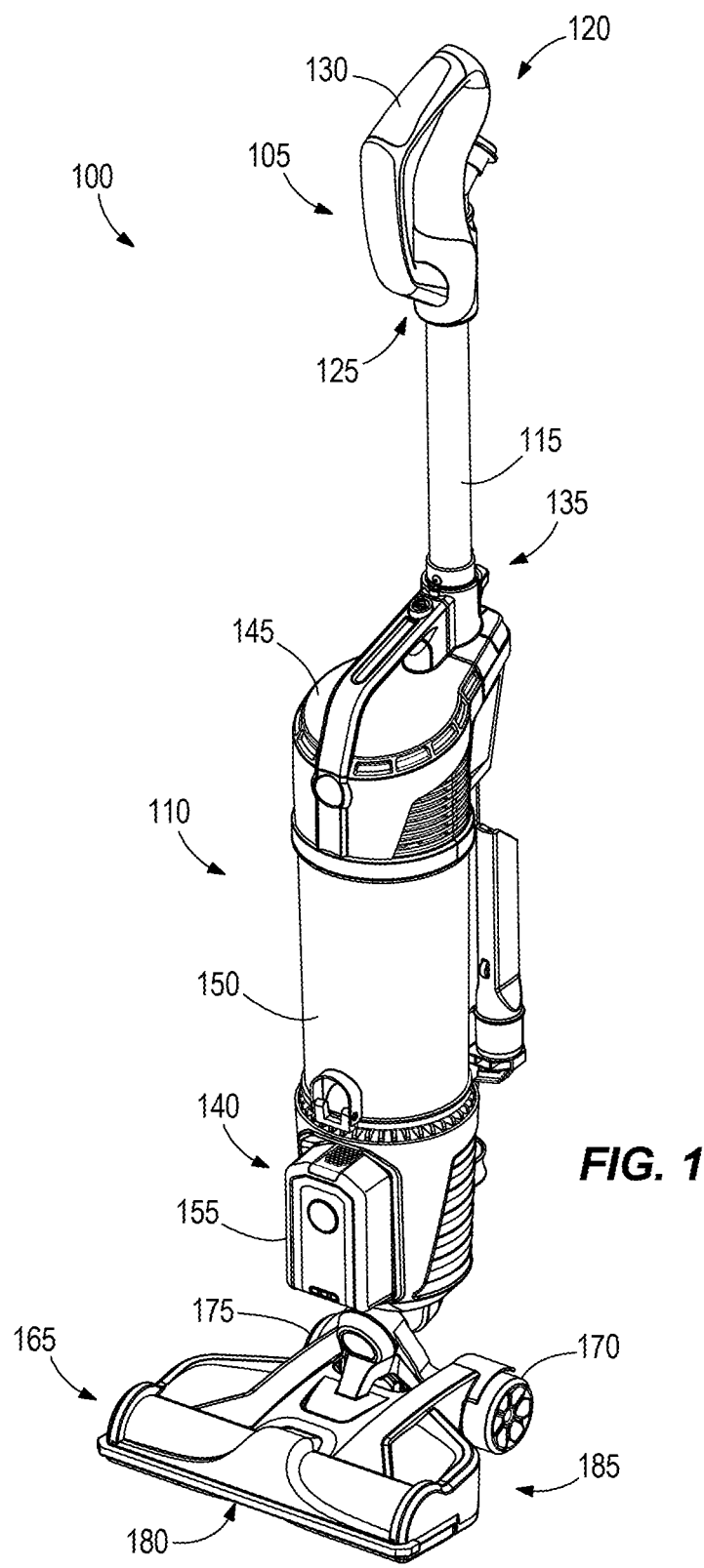
FIG. 1 is a perspective view of a cleaning system.

FIG. 1 illustrates a cleaning system 100. Although illustrated as a stick-type vacuum, the cleaning system 100 can be other types of cleaning systems (e.g., lightweight upright vacuums, hand-held vacuums, carpet cleaners, canister vacuums, bag vacuums, upright vacuums, etc.) The cleaning system 100 includes a handle portion 105 and a body portion 110. In some constructions, the handle portion 105 and the body portion 110 are connected via a spine 115.

The handle portion 105 includes a first section 120 and a second section 125. The first section 120 may be oblique with respect to the second section 125 and includes a grip portion 130. The grip portion 130 is used by a user to grip and control the cleaning system 100.

In some constructions, such as the one illustrated, one or more user-controlled switches 135 are located near the spine 115 on the body portion 110. However, in other constructions, the one or more user-controlled switches 135 may be located on the grip portion 130. In yet other constructions, the one or more user-controlled switches 135 are located on the spine 115 or in other areas of the body portion 110. The one or more user-controlled switches 135 provide operational control of the cleaning system 100 to the user. In some constructions, the one or more user-controlled switches 135 are two-position switches, having for example, an on-position and an off-position.

In some constructions, the second section 125 includes one or more indicators for providing indications to a user related to the operational mode of the cleaning system 100. In some constructions, the one or more indicators are light-emitting diodes (LEDs).

The handle portion 105 may be removably coupled to the body portion 110. For example, the handle portion 105 may be detachable from the body portion 110 providing a suction force or vacuum through at least a portion of the handle portion 105 as a wand, or may be removable for storage or transport purposes. In some constructions, the handle portion 105 is coupled and secured to the body portion 110 via friction only. In other constructions, the handle portion 105 is coupled and secured to the body portion 110 via a screw or other suitable fashionable device. The handle portion 105 further includes a plurality of electrical connectors located at an interface between the handle portion 105 and the body portion 110. The electrical connectors electrically connect the handle portion 105 to the body portion 110, so that electrical signals related to the operation of the cleaning system 100 can be sent from the handle portion 105 to the body portion 110 to control, for example, a motor/fan assembly and/or a brush-roll assembly.

The body portion 110 includes a battery receptacle 140, a motor/fan assembly 145, and a refuse chamber 150. In some constructions, the body portion 110 can further include a cyclonic separator. Alternatively, the body portion 110 can further include a disposable bag for dirt collection. The battery receptacle 140 receives a battery pack 155. The battery receptacle 140 includes a plurality of electrical connectors for electrically connecting the battery pack 155 to the cleaning system 100.

The motor/fan assembly 145 includes a suction motor 160 (FIG. 2) and a rotor, such as an impeller or a fan, coupled to the suction motor 160. In some constructions, the suction motor 160 is a brushless direct-current (BLDC) motor operable at multiple speeds, for example, a high-speed and a low-speed. In other constructions, the suction motor 160 can be a variety of other types of motors, including but not limited to, a single speed motor, a variable speed motor, a brush DC motor, a stepper motor, a synchronous motor, or other DC or AC motors.

The refuse chamber 150 is positioned below the motor/fan assembly 145, and is removably coupled to the cleaning system 100 (e.g., removably coupled to the spine 115, the body portion 110, the motor/fan assembly 145, etc.). In some constructions, the refuse chamber 150 and the motor/fan assembly 145 are removably coupled together, and form a single unit when coupled together. In such a construction, the single unit is then removably coupled to the spine 115 and/or body portion 110. In the illustrated construction, the refuse chamber 150 is bagless and includes a latching mechanism which secures the refuse chamber 150 to the cleaning system 100. The refuse chamber 150 further includes an inlet for receiving refuse. In other constructions, the refuse chamber 150 includes the disposable bag for collecting refuse.

A lower end of the body portion 110 includes an interface attaching the body portion 110 to a base portion 165. The base portion 165 includes a corresponding interface for attaching to the body portion 110. The handle portion 105 and the body portion 110 pivotally move about a first axis parallel to a cleaning surface (e.g., the ground). Pivotal movement about the first axis allows the handle portion 105 and the body portion 110 to be moved from a position approximately perpendicular to the base portion 165 to a position approximately parallel to the ground. For example, the handle portion 105 and body portion 110 are able to be moved through an angle of between approximately 0.0° and approximately 90.0° with respect to the base portion 165. In other constructions, the handle portion 105 and body portion 110 are pivotable through larger or smaller angles.

The handle portion 105 and body portion 110 are also pivotable along a second axis. The second axis is approximately perpendicular to the first axis and is approximately parallel to the handle portion 105 and body portion 110. Pivotal movement about the second axis provides additional control and maneuverability of the cleaning system 100. In some constructions, a pivot joint is employed to allow movement about the first axis and the second axis. In other constructions, a ball joint is employed rather than the pivot joint.

The base portion 165 includes a first wheel 170, a second wheel 175, a suction inlet 180, and a brush-roll assembly 185. The first and second wheels 170, 175 are rotatably coupled to the base portion 165. The suction inlet 180 allows refuse to enter into the cleaning system 100. In some constructions, the suction inlet 180 further includes an aperture which allows larger objects to enter the suction inlet 180 without requiring the user to lift the cleaning system 100.

Figure 2:
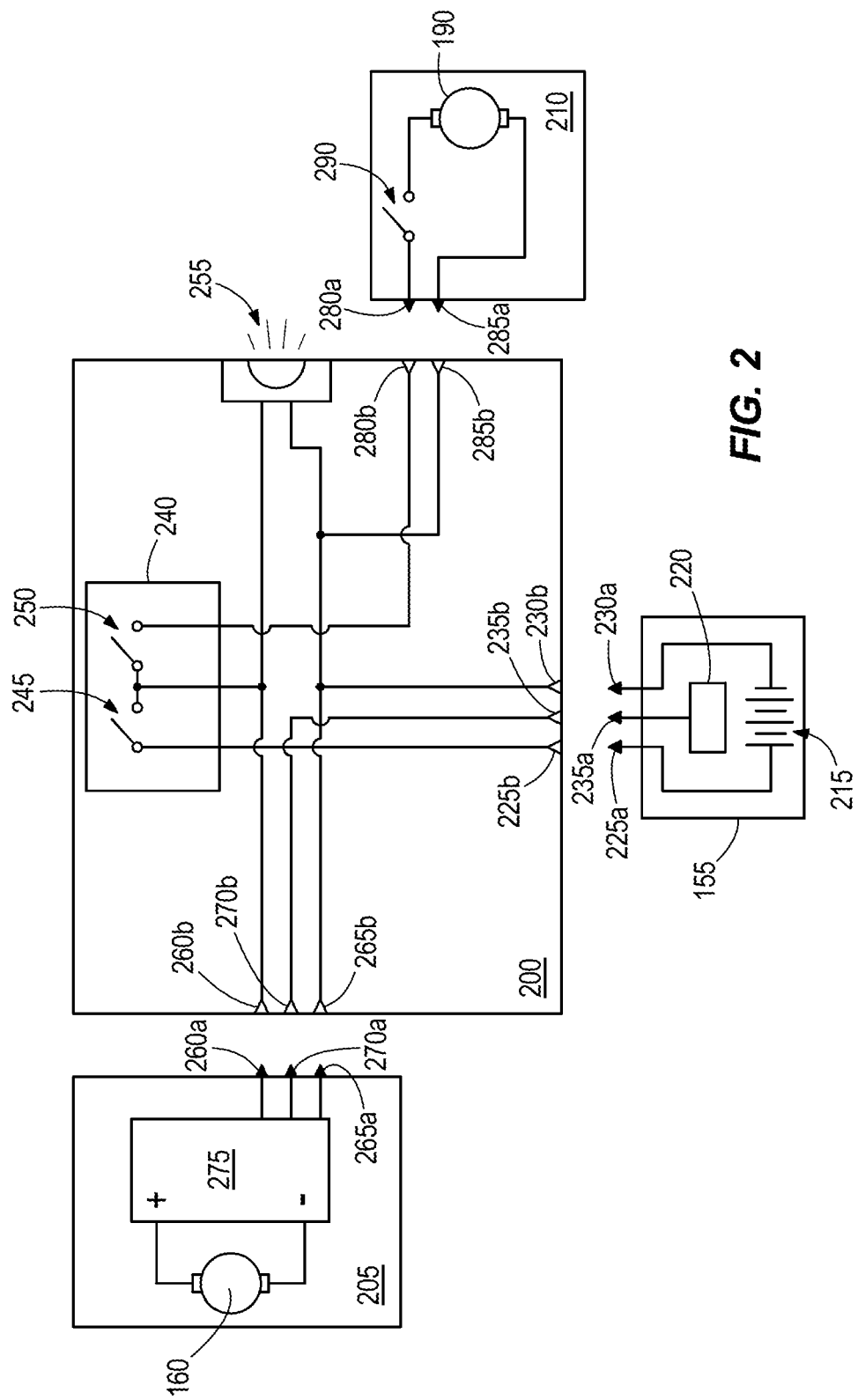
FIG. 2 is a block diagram illustrating the electrical and electronic components of the cleaning system of FIG. 1.

The brush-roll assembly 185 includes a brush and a brush-roll motor 190 (FIG. 2). In some constructions, the brush-roll motor 190 is a BLDC motor operable at multiple speeds, for example, a high-speed and a low-speed. In other constructions, the brush-roll motor 190 can be a variety of other types of motors, including but not limited to, a single speed motor, a variable speed motor, a brush DC motor, a stepper motor, a synchronous motor, or other DC or AC motors.

FIG. 2 is a diagram illustrating electrical and electronic components of the cleaning system 100. In the illustrated construction, the electrical and electronic components of the cleaning system 100 are contained within the battery pack 155, a main body housing 200, a motor/fan assembly housing 205, and a brush-roll assembly housing 210. In other constructions, the electrical and electronic components of the cleaning system 100 may be contained within more, less, or different housings.

The battery pack 155 includes one or more battery cells 215. In some constructions, the battery cells 215 are rechargeable lithium-ion battery cells. In other constructions, the one or more battery cells 215 may have a chemistry other than lithium-ion, such as but not limited to, nickel cadmium, nickel metal-hydride, etc. Additionally or alternatively, the one or more battery cells 215 may be non-rechargeable battery cells. The one or more battery cells 215 may be electrically connected in a series-type connection, a parallel-type connection, or both a series and parallel type connection.

The battery pack 155 further includes a battery controller 220. The battery controller 220 includes a processing unit (e.g., a microprocessor, a microcontroller, or another suitable programmable device) and a memory unit. In some constructions, the battery controller 220 is implemented partially or entirely on a semiconductor (e.g., a field-programmable gate array ["FPGA"] semiconductor) chip. In some constructions, the battery controller 220 senses/monitors a variety of characteristics of the battery cells 215, including but not limited to, voltage, current, capacity, resistance, temperature and number of cells. In some constructions, if any of the sensed/monitored characteristics of the battery cells 215 are out of a predetermined range, the battery controller 220 prohibits the battery pack 155 from outputting current.

The battery pack 155 selectively couples to main body housing 200 via the battery receptacle 140. The battery pack 155 selectively couples to the battery receptacle 140 through the use of one or more latching mechanisms. The battery pack 155 electrically connects to the main body housing 200 through a plurality of terminals. In the illustrated construction, the plurality of terminals include positive battery terminals 225a, 225b, negative battery terminals 230a, 230b, and data serial line, or communications, terminals 235a, 235b. The cleaning system receives power through the positive battery terminals 225a, 225b and is electrically grounded through the negative battery terminals 230a, 230b. The battery pack 155 outputs and/or receives data, or serial data, through the communications terminals 235a, 235b.

The battery receptacle 140 is configured to receive either a first battery pack or a second battery pack. Further, the cleaning system 100 is configured to be powered by either the first battery pack or the second battery pack. In some constructions, the first battery pack has different characteristics than the second battery pack. For example, but not limited to, the first battery pack may have a first capacity (e.g., 2 A-h), while the second battery pack may have a second capacity (e.g., 4 A-h). The characteristics may further be any of, or any combination of, voltage, current, resistance, number of cells, battery identification code, etc. When releasably coupled to the battery receptacle 140, the first battery pack outputs a first type of data through the communications terminals 235a, 235b. The first type of data is identification data identifying the first battery pack, or data indicative of one or more characteristics of the first battery pack. Additionally, when releasably coupled to the battery receptacle 140, the second battery pack outputs a second type of data through the communications terminals 235a, 235b. The second type of data is identification data identifying the second battery pack, or data indicative of one or more characteristics of the second battery pack. The battery pack 155 as discussed herein can be either the first battery pack or the second battery pack.

The main body housing 200 of the cleaning system 100 includes a switch board 240. The switch board 240 selectively controls power from the battery pack 155 to a variety of electrical components of the cleaning system 100, such as but not limited to electrical components of the motor/fan assembly housing 205 and the brush-roll assembly housing 210. In some constructions, the switch board 240 is operated by the one or more user-controlled switches 135. In the illustrated construction, the one or more user-controlled switches 135 include a main power switch 245 and a brush-roll switch 250. In such a construction the main power switch 245 provides power from the battery pack 155 to electrical components within the motor/fan assembly housing 205 and the brush-roll assembly housing 210, while the brush-roll switch 250 provides power from the battery pack 155 to electrical components within the brush-roll assembly housing 210. In some constructions, the switch board 240 may include more or less components. For example, the switch board 240 may include one or more fuses, one or more positive temperature coefficient (PTO) devices, etc.

In some constructions, such as the one illustrated, the main body housing 200 further includes a light 255. In such a construction, the main power switch 245 selectively provides power from the battery pack 155 to the light 255. Upon receiving power, the light 255 illuminates. In some constructions, the light 255 is located on the base portion 165. The light 255 can be one of a light-emitting diode (LED) or an incandescent light bulb.

The main body housing 200 electrically connects to the motor/fan assembly housing 205 via a plurality of electrical terminals, including motor/fan power terminals 260a, 260b, motor/fan ground terminals 265a, 265b, and motor/fan communication terminals 270a, 270b.

The motor/fan assembly housing 205 includes a speed control module 275 connected to the suction motor 160. The speed control module 275 operates the suction motor 160 at a defined speed. In some constructions, the speed control module 275 is a controller that outputs a control signal to the suction motor 160. The control signal operates the suction motor 160 at the defined speed. In one construction, the speed control module 275 outputs a first control signal to operate the suction motor 160 at a first speed, and outputs a second control signal to operates the suction motor 160 at a second speed. In some constructions, the control signal is a pulse-width modulated (PWM) signal having a voltage and a duty cycle (e.g., 10%, 25%, 50%, 75%, etc.). The average voltage value of the PWM signal is output to the suction motor 160 in order to operate the suction motor 160. A PWM signal having a high average voltage drives the motor at a high motor speed. A PWM signal having a low average voltage drives the motor at a low motor speed.

The speed control module 275 receives power through the motor/fan power terminals 260a, 260b and is grounded through motor/fan ground terminals 265a, 265b. The speed control module 275 further receives data through the motor/fan communication terminals 270a, 270b. In the illustrated construction, the data received through the motor/fan communication terminals 270a, 270b is from the battery controller 220 of the battery pack 155. In some constructions, the speed control module 275 receives data from the battery controller 220, determines a motor operating speed based on the received data, and outputs a control signal indicative of the motor operating speed to the suction motor 160. For example, the data may be a first type of data from the first battery pack or a second type of data from the second battery pack. The speed control module 275 interprets the received data and operates the suction motor 160 at a first speed when the first type of data is received (i.e., the first battery pack is connected) or at a second speed when the second type of data is received (i.e., the second battery pack is connected).

In other constructions, the speed control module 275 receives a motor operating speed from the battery controller 220, and outputs a control signal indicative of the motor operating speed to the suction motor 160. For example, the speed control module 275 may receive a first type of data related to a first operating speed or a second type of data related to a second operating speed. The speed control module 275 operates the suction motor 160 at the first operating speed (i.e., when the first battery pack is connected) or at the second operating speed (i.e., when the second battery pack is connected).

In some constructions, the motor/fan assembly housing 205 selectively couples to the main body housing 200 via one or more latching mechanisms. In other constructions, the motor/fan assembly housing 205 is permanently affixed to the main body housing 200.

The main body housing 200 electrically connects to the brush-roll assembly housing 210 via a plurality of electrical terminals. In the illustrated construction, the plurality of terminals includes brush-roll power terminals 280a, 280b and brush-roll ground terminals 285a, 285b. In other constructions, there may further be brush-roll communication terminals.

The brush-roll assembly housing 210 includes a switch 290 and the brush-roll motor 190. The switch 290 receives power through the brush-roll power terminals 280a, 280b and selectively provides power to the brush-roll motor 190. Upon receiving power, the brush-roll motor 190 rotates the brush. The brush-roll motor 190 is ground through the brush-roll ground terminals 285a, 285b.

In some constructions, the switch 290 is activated when the cleaning system 100 is in an operation position, such as when the handle portion 105 and the body portion 110 are tilted downward along the first axis at an approximate angle of less than 90°. In such a construction, the switch 290 is deactivated when the cleaning system 100 is in an upright position, such as when the handle portion 105 and the body portion 110 are tilted upward along the first axis at an angle equal to approximately 90°.

In some constructions, the brush-roll motor 190 is operated by the speed control module 275, or the control signal from the speed control module 275. In such a construction, the brush-roll motor 190 receives the control signal from the speed control module 275 through the brush-roll power terminals 280a, 280b. The brush-roll motor 190 operates at a speed (e.g., a first brush-roll-motor speed, a second brush-roll-motor speed, etc.) based on the control signal.

Figure 3:
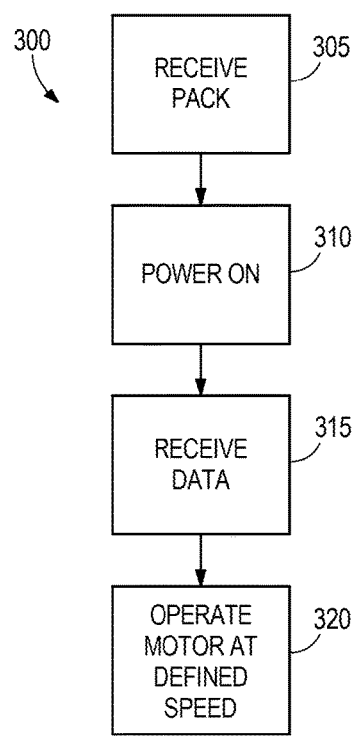
FIG. 3 is a flow chart illustrating an operation of the cleaning system of FIG. 1.

FIG. 3 is a flow chart illustrating an operation 300 of the cleaning system 100. Although illustrated as occurring in a sequential order, it should be understood that the order of the steps discloses in operation 300 may vary. Furthermore, additional steps may be included in the operation 300 and not all of the steps may be required. The battery receptacle receives the battery pack 155 (Step 305). The cleaning system 100 is powered on (Step 310). The speed control module 275 received data from the battery pack 155 (Step 315). The speed control module 275 operates the suction motor 160 at a defined speed based on the received data (Step 320).

Figure 4:
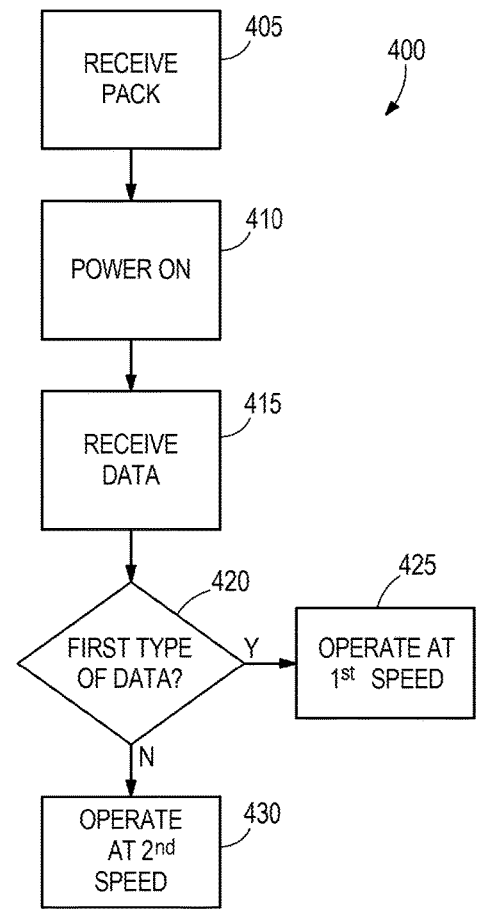
FIG. 4 is a flowchart illustrating an operation of the cleaning system of FIG. 1.

FIG. 4 is a flow chart illustrating a specific operation 400 of the cleaning system 100. Although illustrated as occurring in a sequential order, it should be understood that the order of the steps discloses in operation 400 may vary. Furthermore, additional steps may be included in the operation 400 and not all of the steps may be required. The battery receptacle 140 receives the first battery pack or the second battery pack (Step 405). The cleaning system 100 is powered on (Step 410). The speed control module 275 receives data from the battery pack 155 (Step 415). The speed control module 275 determines if the data is a first type of data (Step 420). If the received data is a first type of data, the speed control module 275 operates the suction motor 160 at a first speed (Step 425). If the received data is not a first type of data, and thus a second type of data, the speed control module 275 operates the suction motor 160 at a second speed (Step 430).

Thus, the invention provides, among other things, a cleaning system configured to receive a battery pack and operate a suction motor based on the data received from the battery pack. Various features and advantages of the invention are set forth in the following claims.

What is claimed is:

1. A method of operating a cleaning system, the method comprising:
    receiving a first battery pack including a first battery controller;
    receiving a first signal from the first battery controller;
    outputting a first control signal based on receiving the first signal;
    operating a motor at a first speed based on the first control signal;
    receiving a second battery pack including a second battery controller;
    receiving a second signal from the second battery controller;
    outputting a second control signal based on receiving the second signal; and
    operating the motor at a second speed based on the second control signal.

2. The method of claim 1, further comprising,
    operating a second-motor at a first speed based on the first control signal; and
    operating the second-motor at a second speed based on the second control signal.

3. The method of claim 1, wherein the motor drives an impeller.

4. The method of claim 1, wherein the motor drives a brush-roll.

5. The method of claim 1, wherein the first signal includes a first characteristic of the first battery pack and the second signal includes a second characteristic of the second battery pack.

6. The method of claim 1, wherein receiving the first battery pack includes receiving the first battery pack in a battery receptacle, and wherein receiving the second battery pack includes receiving the second battery pack in the battery receptacle.

7. The method of claim 6, wherein the first control signal includes a signal indicative of a first battery capacity and the second control signal includes a signal indicative of a second battery capacity.

8. The cleaning system of claim 1, wherein the first control signal includes a signal indicative of a first battery identification code and the second control signal includes a signal indicative of a second battery identification code.

* * * * *